US006752225B2

(12) United States Patent
Kojima

(10) Patent No.: US 6,752,225 B2
(45) Date of Patent: Jun. 22, 2004

(54) REGENERATION CONTROL APPARATUS AND METHOD FOR VEHICLE

(75) Inventor: Masakiyo Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/996,679

(22) Filed: Nov. 30, 2001

(65) Prior Publication Data

US 2002/0063000 A1 May 30, 2002

(30) Foreign Application Priority Data

Nov. 30, 2000 (JP) ........................................ 2000-364299

(51) Int. Cl.$^7$ ................................................. B60K 6/06
(52) U.S. Cl. ............................ 180/65.3; 477/3; 477/39
(58) Field of Search ............................... 180/65.3, 65.1, 180/65.4; 477/3, 4, 37, 39, 41, 44

(56) References Cited

U.S. PATENT DOCUMENTS

| | | | | | |
|---|---|---|---|---|---|
| 5,103,693 | A | * | 4/1992 | Hibi | .............................. 74/866 |
| 5,157,993 | A | * | 10/1992 | Abo | .............................. 74/867 |
| 5,720,690 | A | * | 2/1998 | Hara et al. | ..................... 477/20 |
| 5,993,351 | A | * | 11/1999 | Deguchi et al. | ................ 477/5 |
| 6,019,699 | A | * | 2/2000 | Hoshiya et al. | ............... 477/20 |
| 6,033,338 | A | * | 3/2000 | Jackson et al. | ............... 477/44 |
| 6,048,289 | A | * | 4/2000 | Hattori et al. | ................. 477/15 |
| 6,083,139 | A | * | 7/2000 | Deguchi et al. | ............... 477/5 |
| 6,278,915 | B1 | * | 8/2001 | Deguchi et al. | .............. 701/22 |
| 6,336,888 | B1 | * | 1/2002 | Eguchi | .......................... 477/3 |
| 6,377,883 | B1 | * | 4/2002 | Shimabukuro et al. | ....... 701/51 |
| 6,428,444 | B1 | * | 8/2002 | Tabata | ........................... 477/3 |
| 6,432,024 | B2 | * | 8/2002 | Hattori et al. | ................. 477/44 |

FOREIGN PATENT DOCUMENTS

| | | |
|---|---|---|
| DE | 19623847 A1 | 12/1996 |
| JP | 8-251708 A | 9/1996 |
| JP | 2000-23313 A | 1/2000 |

* cited by examiner

Primary Examiner—Bryan Fischmann
Assistant Examiner—Jeffrey J. Restifo
(74) Attorney, Agent, or Firm—Oliff & Berridge, PLC

(57) ABSTRACT

The shift control of a transmission is performed on different bases depending on whether an engine is connected so as to be passively turned, or is disconnected. During the disengaged state, the shift control is performed so that the power generation efficiency of a motor-generator becomes maximized under a predetermined condition. During the engaged state, the shift control is performed so that the turning resistance of the engine becomes minimized under a predetermined condition. Therefore, during running of the vehicle, a battery can be charged through the regeneration control of the motor-generator. Even when the regeneration control is performed while the passive turning of the engine is allowed, good electric power generation efficiency can be achieved.

19 Claims, 7 Drawing Sheets

FIG. 4

| POSITIION | MODE | ENGAGING ELEMENT | C1 | C2 | B1 |
|---|---|---|---|---|---|
| B,D | ETC MODE | | × | ○ | × |
| | LOCKED-UP MODE | | ○ | ○ | × |
| | MOTOR RUN MODE (FORWARD) | | ○ | × | × |
| N,P | NEUTRAL | | × | × | × |
| | CHARGE, ENGINE START MODE | | × | × | ○ |
| R | MOTOR RUN MODE (REVERSE) | | ○ | × | × |
| | FRICTION RUN MODE | | ○ | × | △ |

REGENERATION CONTROL APPARATUS AND METHOD FOR VEHICLE

INCORPORATION BY REFERENCE

The disclosure of Japanese Patent Application No. 2000-364299 filed on Nov. 30, 2000, including the specification, drawings and abstract, is incorporated herein by reference in its entirety.

BACKGROUND OF THE INVENTION

1. Field of Invention

The invention relates to a regeneration control apparatus and method for a vehicle, and more particularly to a shift control of a transmission performed at the time of power generation through regeneration control of a rotation device.

2. Description of Related Art

A known vehicle has: (a) an internal combustion engine connected to a drive wheel of the vehicle via a transmission capable of changing the speed ratio; (b) a connection-disconnection device that is engaged to allow and is disengaged to prohibit power transfer between the internal combustion engine and the transmission; (c) a rotation device that is connected to the drive wheel via the transmission and that functions at least as an electric power generator; and (d) a regeneration controller that, during the running of the vehicle, causes the rotation device to generate electric power through regeneration control of the rotation device and applies a braking force to the vehicle.

An example of such vehicles is a hybrid vehicle described in Japanese Patent Application Laid-Open No. 8-251708, in which the rotation device is a motor-generator that selectively functions as both a power generator and an electric motor, and the transmission is a belt-type continuously variable transmission. During the regeneration control by the regeneration controller, the speed shift of the transmission is controlled so that the motor-generator rotates at a rotation speed that provides the highest power generating efficiency.

However, if the speed shift control is performed based only on the electric power generating efficiency of the motor-generator, a problem in energy efficiency occurs as follows. That is, if the connection device is engaged and therefore the internal combustion engine is passively turned by the rotation of the motor-generator, braking force is generated by the turning resistance of the engine due to the pump effect, friction loss, etc., so that the amount of electric power generated by the motor-generator (regenerative braking torque) decreases. Thus, energy efficiency deteriorates. During the regeneration control, it is appropriate to disengage the connection-disconnection device and thereby disconnect the engine. However, there are cases where the regeneration control must be performed while the connection-disconnection device is engaged so that the engine is passively turned, including a case where quick supply of drive power from the internal combustion engine is needed, for example, during a re-acceleration in a high-speed vehicle run during which a sufficient drive power cannot be produced by the electric motor alone.

SUMMARY OF THE INVENTION

Accordingly, it is one object of the invention to make it possible to achieve excellent power generating efficiency even when regeneration control is performed while the passive turning of the engine is allowed.

In order to achieve the aforementioned and/or other objects, one aspect of the invention provides a regeneration control apparatus for a vehicle that includes (a) an internal combustion engine connected to a drive wheel of the vehicle via a transmission capable of shifting a speed ratio, (b) a connection-disconnection device that is selectively engaged to allow and disengaged to prohibit a power transfer between the internal combustion engine and the transmission, and (c) a rotation device that is connected to the drive wheel via the transmission and that functions at least as an electric power generator. The regeneration control apparatus further has a controller that (d) performs a regeneration control of the rotation device so that the rotation device generates electricity and applies a braking force to the vehicle during running of the vehicle, and that (e) during the regeneration control, selectively controls the speed ratio of the transmission on different bases depending on whether the connection-disconnection device is in a connected state or a disconnected state.

The invention also provides a method of controlling regeneration of electric power in a vehicle that includes (a) an internal combustion engine connected to a drive wheel of the vehicle via a transmission capable of shifting a speed ratio, (b) a connection-disconnection device that is selectively engaged to allow and disengaged to prohibit a power transfer between the internal combustion engine and the transmission, and (c) a rotation device that is connected to the drive wheel via the transmission and that functions at least as an electric power generator. In the control method, the speed ratio of the transmission is controlled on different bases depending on whether the connection-disconnection device is determined to be in a connected state or a disconnected state, when a request for deceleration of the vehicle is made. The regeneration control of the rotation device is performed so as to generate electricity and apply a braking force to the vehicle.

In the regeneration control apparatus and method for a vehicle according to this aspect of the invention, the shift control of the transmission is performed on different bases depending on whether the connection-disconnection device is in the engaged state, such that the engine is passively turned, or the disengaged state, such that the engine is disconnected. Therefore, during each of the states, the regeneration control of the rotation device can be performed at excellent energy efficiency.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which:

FIG. 4 is a table indicating relationships between various ran modes entered by the hybrid drive control apparatus shown in FIG. 1 and the states of operation of clutches and a brake;

DETAILED DESCRIPTION OF PREFERRED EMBODIMENTS

Figure 1:
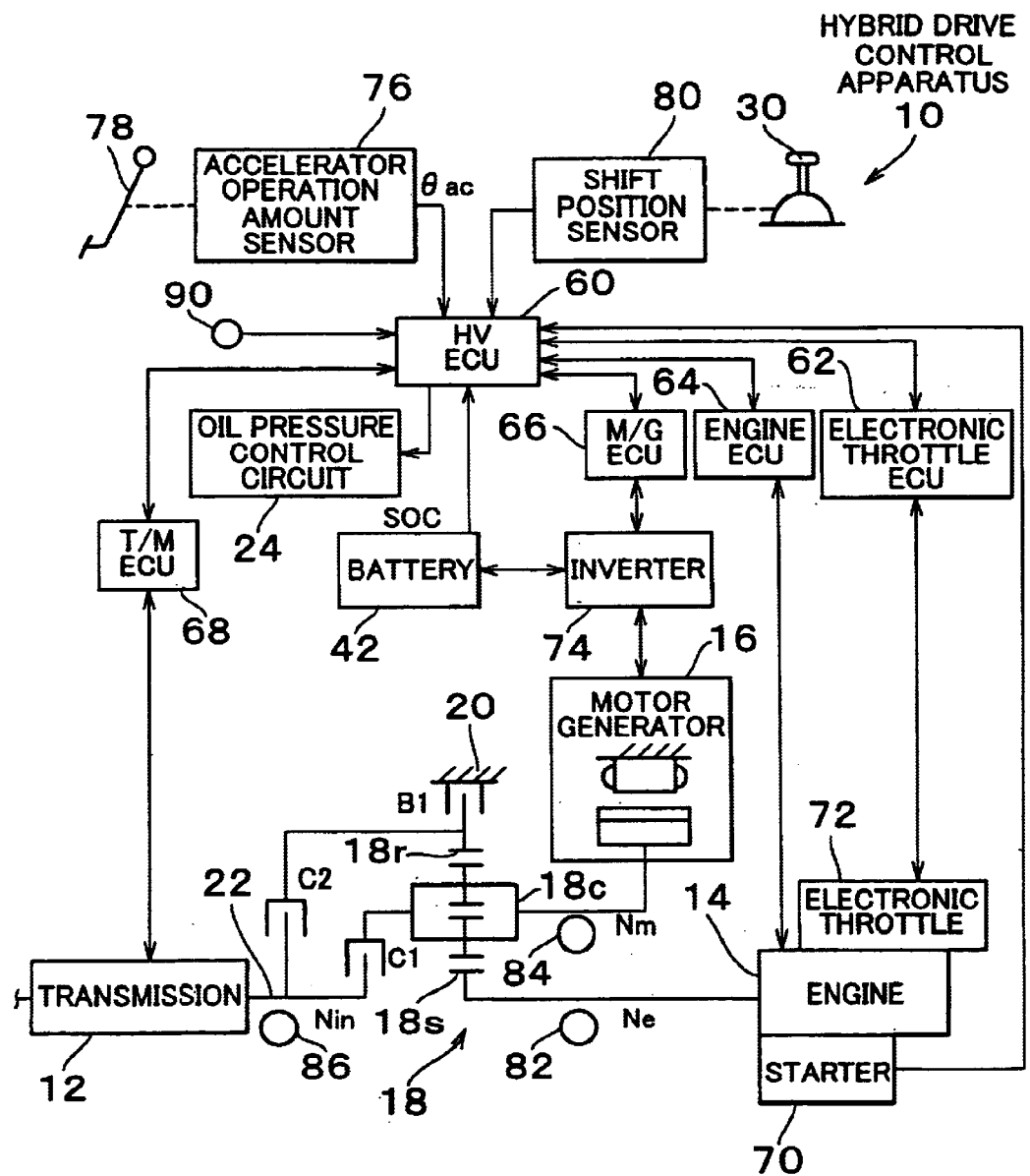
FIG. 1 is a schematic diagram illustrating a hybrid drive control apparatus to which an embodiment of the invention is applied.

In the following description and the accompanying drawings, the present invention will be described in more detail with reference to exemplary, preferred embodiments.

It is preferable that the transmission employed be a continuously variable transmission of a belt type, a toroidal type, etc. However, the invention is also applicable to vehicles having a stepwise variable transmission. The connection-disconnection device is preferably a friction engagement type clutch or brake. For example, the connection-disconnection device is disposed so as to selectively allow and prohibit power transfer between an internal combustion engine and a rotation device connected to the transmission. When engaged, the connection-disconnection device causes the rotation device and the engine to turn together as one unit. With regard to the connection-disconnection device, various arrangements are possible, for example, an arrangement in which one of three rotating elements of a gear-type differential device (a planetary gear unit or the like) is fixed by a brake, and the rotation device and the engine connected to the other two rotating elements are turned with respect to each other, and a resultant torque from the rotation device and the engine is output toward the transmission.

The invention is suitably applicable to a hybrid vehicle equipped with an electric motor in addition to an internal combustion engine as drive power sources of the vehicle. In the hybrid vehicle, the rotation device is preferably a motor-generator that performs both the function of an electric motor and the function of an electric generator. The invention is also applicable to a vehicle that runs only by an internal combustion engine, a vehicle that runs by an internal combustion engine while using, as reaction force, the regenerative braking torque caused by power generation of the rotation device. The invention may also be applied to a hybrid vehicle equipped with a vehicle-driving electric motor or motor-generator in addition to the rotation device for use as an electric generator.

Regeneration control of the rotation device is performed, for example, when the output requested from a driver of the vehicle, such as the amount of operation of an accelerator or the like, becomes zero during a forward run of the vehicle, or when a foot brake is depressed. The regeneration control may also be performed during a reverse run of the vehicle. The regenerative braking torque of the rotation device may be pre-set to a predetermined value. It is also possible to determine a regenerative braking torque of the rotation device by using, as a parameter, a requested amount regarding the brake, for example, the depressing force on the foot brake or the like, the speed ratio of the transmission, etc. Thus, various embodiments are possible regarding the regenerative braking torque of the rotation device. Although it is a normal practice to cut off the fuel supply to the engine during the regeneration control, the engine may also be kept in operation, for example, in an idling state or the like, during the regeneration control.

At the time of the regeneration control, the transmission is usually controlled as follows. That is, when the connection-disconnection device is in a disengaged state, a requested braking power work per unit time (braking power) is determined in accordance with, for example, the requested braking torque and the vehicle speed. Using a predetermined map or the like, a target rotation speed that maximizes the electric power generation efficiency is determined on condition that the target rotation speed is on a rotation device rotation speed-braking torque line that provides the aforementioned requested braking power, and is within a range of rotation speed achievable by the shift control of the transmission. Then, the shift control is performed so that the rotation speed of the rotation device becomes equal to the target rotation speed. It is also possible to limit the electric power generation efficiency by using a safeguard providing a limit) or the like, or to set a target rotation speed by introducing the charging efficiency of the battery as a factor. Various other embodiments are possible. For example, the shift control may be performed so that the rotation device will operate at a predetermined rotation speed or a predetermined regenerative braking torque at which the best generation efficiency is achieved.

Furthermore, when the connection-disconnection device is in an engaged state, the control of the transmission at the time of the regeneration control is performed as follows. That is, the shift control is performed, for example, in such a manner that the rotation speed of the internal combustion engine reaches a minimum within a range of rotation speed of the engine achievable by the shift control of the transmission (reaches an idle speed if the engine is operating in an idle state) so as to minimize the turning resistance of the engine. However, if the rotation speed becomes excessively low while the engine is in a stopped (fuel-cut) state, it becomes impossible to restart the engine. Therefore, it is preferable to provide a predetermined lower limit engine speed (e.g., 1200 rpm or the like). Thus, it is preferable to perform the shift control so that the rotation speed of the engine reaches a minimum rotation speed that is greater than or equal to the lower limit value and that is achievable by the shift control of the transmission.

A preferred embodiment of the invention will now be described in detail with reference to the drawings.

Figure 2:
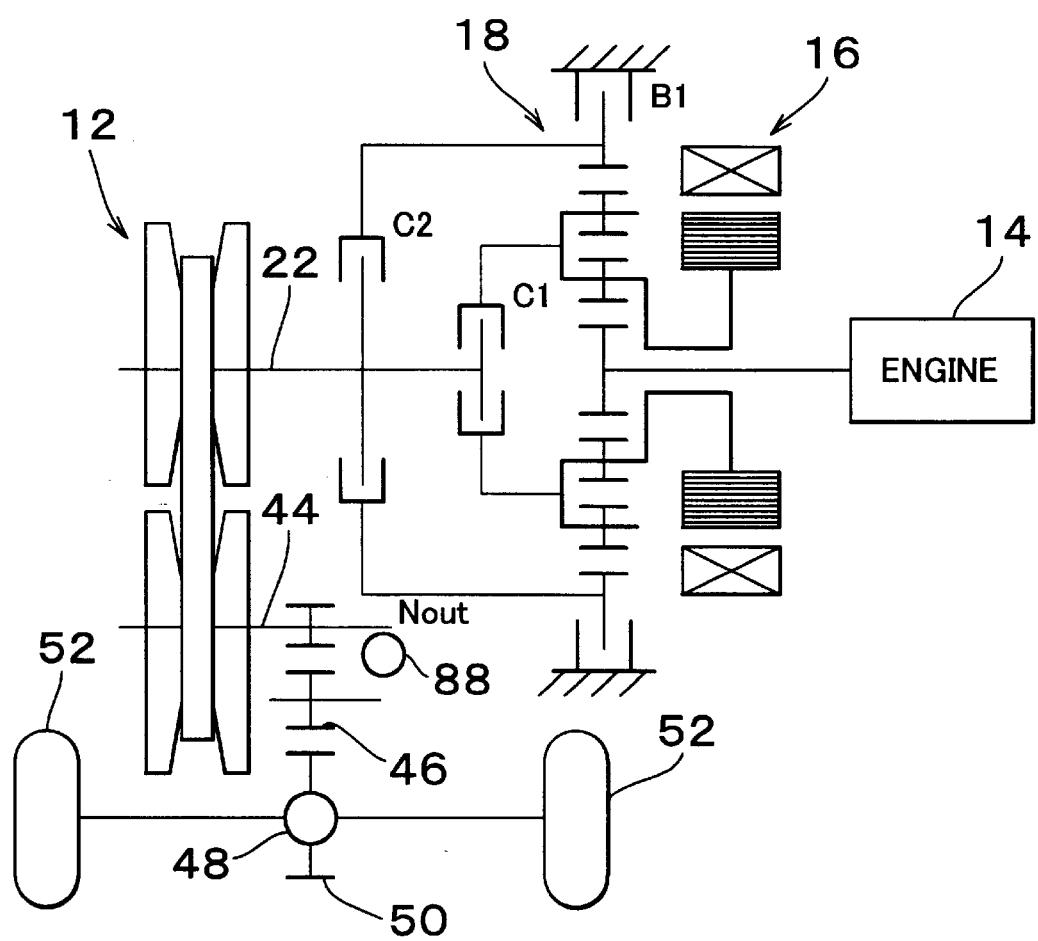
FIG. 2 is a high level diagram illustrating a drive power transfer system of the hybrid drive control apparatus shown in FIG. 1.

FIG. 1 is a schematic diagram illustrating a hybrid drive control apparatus 10 to which the invention is applied. FIG. 2 is a high level diagram illustrating a transmission 12. The hybrid drive control apparatus 10 includes an engine 14 that produces power through combustion of a fuel, a motor-generator 16 for use as an electric motor and an electric generator, and a double-pinion type planetary gear unit 18. The hybrid drive control apparatus 10 is installed in a transverse orientation in an FF (front engine-front drive) vehicle or the like. A sun gear 18s of the planetary gear unit 18 is connected to the engine 14. A carrier 18c thereof is connected to the motor-generator 16. A ring gear 18r is connectable to a case 20 via a first brake B1. The carrier 18c is connectable to an input shaft 22 of the transmission 12 via a first clutch C1. The ring gear 18r is connectable to the input shaft 22 via a second clutch C2. The engine 14 corresponds to an internal combustion engine, and the motor-generator 16 corresponds to a rotation device according to one aspect of the invention. The planetary gear unit 18 is a gear-type differential device. Together with the first clutch C1, the second clutch C2 and the first brake B1, the planetary gear unit 18 forms a connection-disconnection device that is selectively engaged to allow and disengaged to prohibit power transfer between the engine 14 and the transmission 12.

Figure 3:
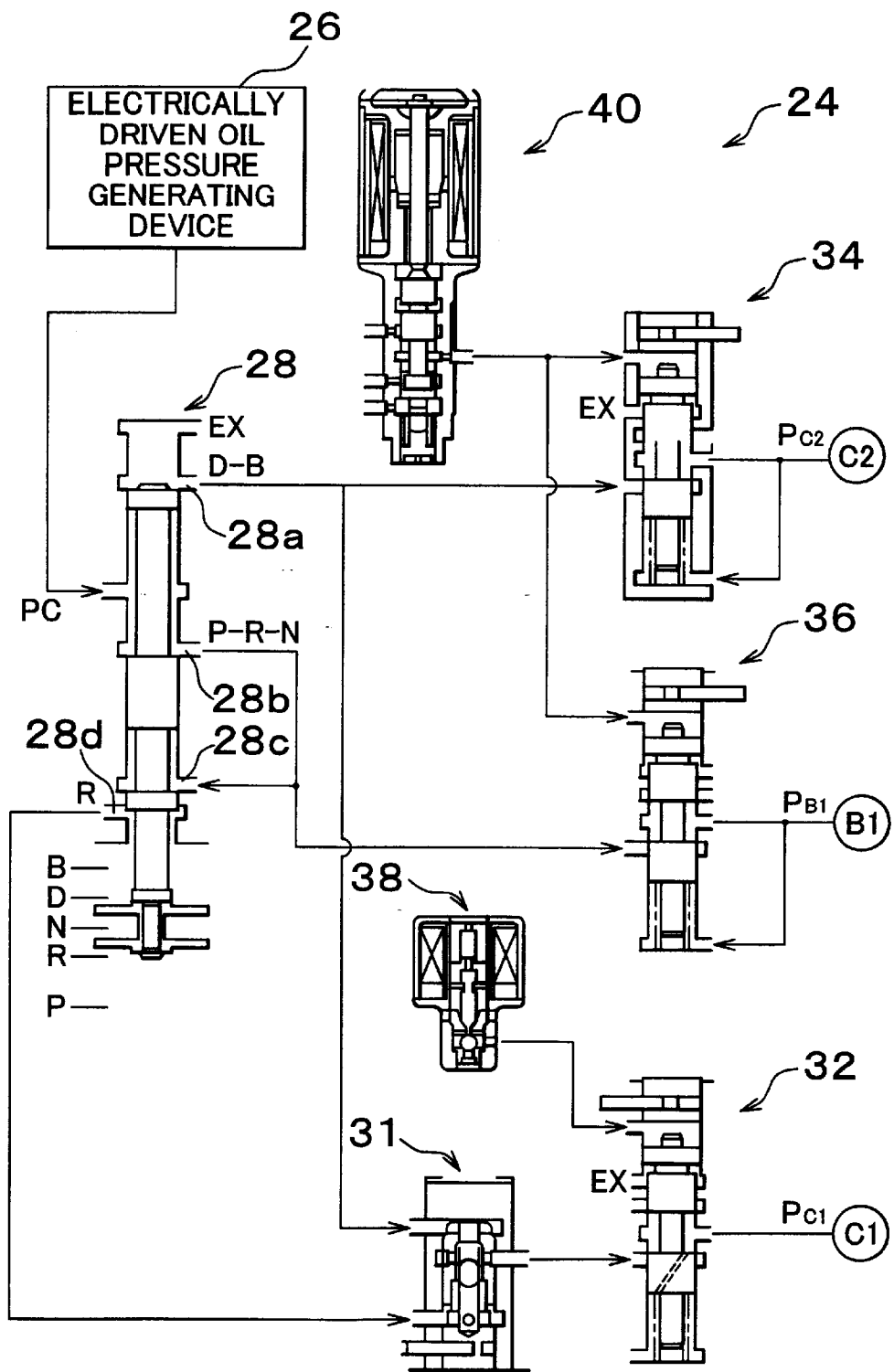
FIG. 3 is a circuit diagram illustrating portions of an oil pressure control circuit shown in FIG. 1.

Each of the clutches C1, C2 and the first brake B1 is a multi-plate wet type hydraulic friction engagement device that is put into friction engagement by a hydraulic actuator. Each device is put into friction engagement by hydraulic oil supplied from an oil pressure control circuit 24. FIG. 3 is a diagram illustrating portions of the oil pressure control circuit 24. An electrically-driven oil pressure generating device 26 that includes an electric pump generates a source pressure PC, which is supplied to the clutches C1, C2 and the brake B1 via a manual valve 28 in accordance with the shift position of a shift lever 30 (see FIG. 1). The shift lever 30 is a shift operating member that is operated by a driver of the vehicle. In this embodiment, the shift lever 30 is selectively operated to five shift positions: "B", "D", "N", "R" and "P". The manual valve 28 is connected to the shift lever 30 via a cable, a link, etc., and is mechanically switched in accordance with the operation of the shift lever 30.

The "B" position is a shift position where a relatively great power source brake is generated, for example, upon a downshift of the transmission 12 during a forward vehicle run. The "D" position is a shift position for forward running. At these positions, the source pressure PC is supplied to the clutches C1 and C2 via an output port 28a. The source pressure PC is supplied to the first clutch C1 via a shuttle valve 31. The "N" position is a shift position where power transfer from the drive power source is prohibited or cut off. The "R" position is a shift position for reverse running. The "P" position is a shift position where the power transfer from the drive power source is cut off and rotation of drive wheels is mechanically prevented by a parking lock device (not shown). At these shift positions, the source pressure PC is supplied to the first brake B1 via an output port 28b. The source pressure PC output from the output port 28b is input to a return port 28c as well. At the "R" position, the source pressure PC is supplied to the first clutch C1 via the return port 28c, an output port 28d and the shuttle valve 31.

The clutches C1, C2 and the brake B1 are provided with control valves 32, 34, 36, respectively, which control the oil pressures $P_{C1}$, $P_{C2}$, $P_{B1}$ thereon. The oil pressure $P_{C1}$ on the clutch C1 is regulated by an on-off valve 38. The oil pressures $P_{C2}$, $P_{B1}$ on the clutch C2 and the brake B1 are regulated by a linear solenoid valve 40.

Various running modes shown in FIG. 4 are selectively entered in accordance with the states of operation of the clutches C1, C2 and the brake B1. That is, when the shift lever 30 is at the "B" position or the "D" position, one of the "ETC mode", the "locked-up mode" and the "motor run mode (forward)" is entered. In the "ETC mode", the second clutch C2 is engaged and the first clutch C1 and the first brake B1 are released, that is, while the sun gear 18s, the carrier 18c and the ring gear 18r are relatively rotatable. With this state maintained, the engine 14 and the motor-generator 16 are both operated to apply torque to the sun gear 18s and the carrier 18c so that the ring gear 18r is turned so as to run the vehicle forward. In the "locked-up mode", the engine 14 is operated while the clutches C1, C2 are engaged and the brake B1 is released, so that the vehicle is run forward. In the "motor run mode (forward)", the motor-generator 16 is operated while the first clutch C1 is engaged and the second clutch C2 and the first brake B1 are released, so that the vehicle is run forward. Furthermore in the "motor run mode (forward)", electricity can be generated from kinetic energy of the vehicle so as to charge a battery 42 (see FIG. 1) and apply a braking force to the vehicle through the regeneration control of the motor-generator 16 at the time of depression of the foot brake (at the brake-on time) or the like.

Figure 5A:
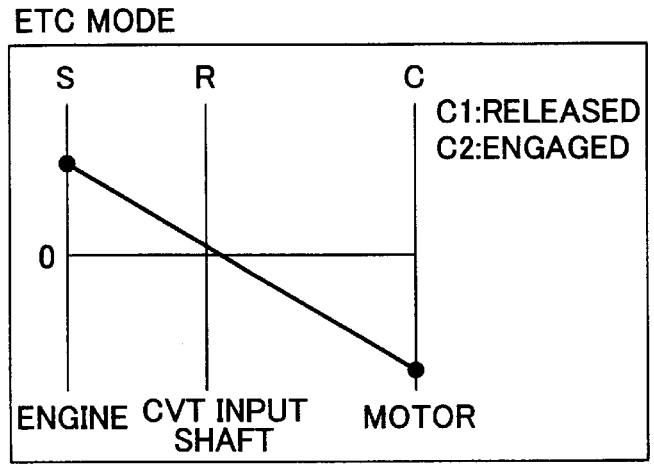
FIGS. 5a to 5c are nomograms indicating relationships among the rotation speeds of rotational elements of a planetary gear unit in the ETC mode, the locked-up mode, and the motor run mode (forward) shown in FIG. 4.
Figure 5B:
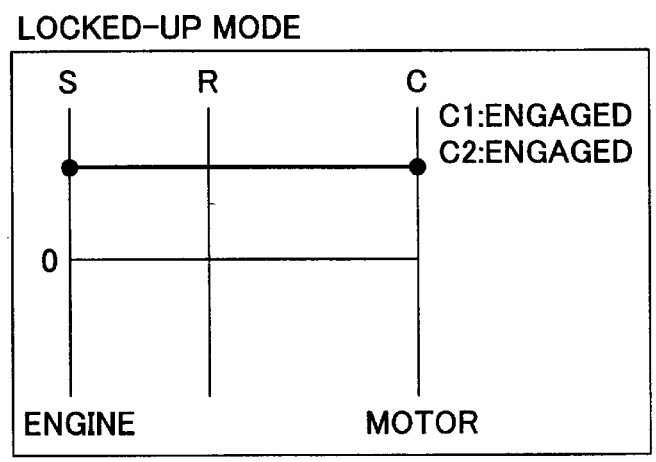
Figure 5C:
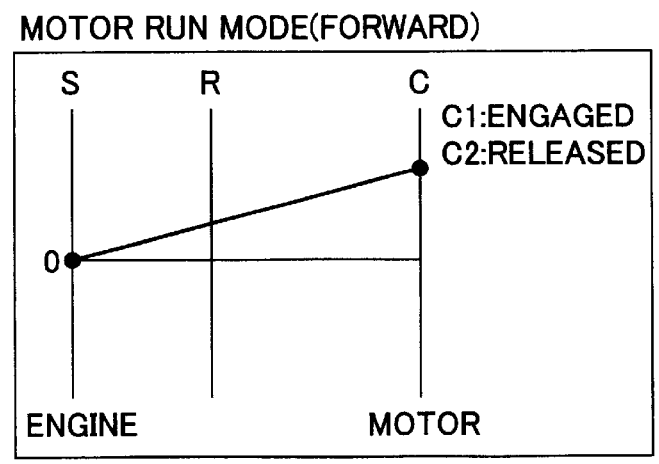

FIGS. 5a to 5c are nomograms indicating the states of operation of the planetary gear unit 18 during the aforementioned forward modes. In the nomograms, "S", "R" and "C" represent the sun gear 18s, the ring gear 18r and the carrier 18c, respectively. The intervals between the lines "S", "R", "C" are determined by a gear ratio $\rho$(=the number of teeth of the sun gear 18s/the number of teeth of the ring gear 18r). Specifically, assuming that the interval between the lines "S" and "C" is "1", the interval between the lines "R" and "C" becomes $\rho$, which is about "0.6" in this embodiment. As for the torque ratio in the "ETC mode" (FIG. 5a), engine torque Te:CVT input shaft torque Tin:motor torque Tm=$\rho$:1:1−$\rho$. Thus, the motor torque Tm needed is smaller than the engine torque Te. Furthermore, during a steady state, a torque obtained by summing the motor torque Tm and the engine torque Te equals the CVT input shaft torque Tin. It should be noted herein that "CVT" refers to a continuously variable transmission and that the transmission 12 in this embodiment is a belt-type continuously variable transmission.

Referring back to FIG. 4, when the shift lever 30 is at the "N" position or the "P" position, one of the "neutral mode" and the "charge-engine start mode" is entered. During the "neutral mode", the clutches C1, C2 and the first brake B1 are all released. During the "charge-engine start mode", the clutches C1, C2 are released and the first brake B1 is engaged. While this state is maintained, the motor-generator 16 is reversely operated to start the engine 14, or the motor-generator 16 is driven by the engine 14 via the planetary gear unit 18 and an electric power generation control is performed to generate electric energy so as to charge the battery 42 (see FIG. 1).

When the shift lever 30 is at the "R" position, the "motor run mode (reverse)" or the "friction run mode" is entered. During the "motor run mode (reverse)", the first clutch C1 is engaged and the second clutch C2 and the first brake B1 are released. While this state is maintained, the motor-generator 16 is reversely driven to reversely turn the carrier 18c and therefore the input shaft 22, so that the vehicle is reversely run. The "friction run mode" is entered when an assist request is made during the reverse run in the "motor run mode (reverse)". During the "friction run mode", the engine 14 is started so as to forwardly turn the sun gear 18s. While the ring gear 18r is rotating forward along with the rotation of the sun gear 18s, the first brake B1 is brought into slip engagement to restrict the rotation of the ring gear 18r so that a reverse turning force is applied to the carrier 18c to assist the reverse run of the vehicle.

The transmission 12, that is, a belt-type continuously variable transmission, outputs power from an output shaft 44 (FIG. 2). The power is then transferred to a ring gear 50 of a differential device 48 via a counter gear 46. The differential device 48 distributes powers to right and left-side drive wheels (front wheels in the embodiment) 52.

The hybrid drive control apparatus 10 of the embodiment is controlled by an HV ECU 60 shown in FIG. 1. The HV ECU 60 has a CPU, a RAM, a ROM, etc. By processing signals in accordance with programs pre-stored in the ROM while using the temporary storage function of the RAM, the HV ECU 60 controls an electronic throttle ECU 62, an engine ECU 64, an M/G ECU 66, a T/M ECU 68, the on-off valve 38 of the oil pressure control circuit 24, the linear solenoid valve 40, a starter 70 of the engine 14, etc. The electronic throttle ECU 62 controls the opening and closing of an electronic throttle valve 72 of the engine 14. The engine ECU 64 controls the output of the engine 14 based on the amount of fuel injection, a variable valve timing mechanism, an ignition timing, etc. The M/G ECU 66 controls the motoring torque, the regenerative brake torque, etc., of the motor-generator 16 via an inverter 74. The TIM ECU 68 controls the speed ratio γ(=input shaft rotation speed Nin/output shaft rotation speed Nout) of the transmission 12, the belt tension thereof, etc. The oil pressure control circuit 24 has a circuit for controlling the speed ratio γ and the belt tension of the transmission 12. The starter 70 is a motor-generator that is connected to a crankshaft of the engine 14 via a power transfer device, such as a belt or a chain.

The HV ECU 60 is supplied with a signal that indicates the amount of operation θac of an accelerator pedal 78 provided as an accelerator operating member, from an accelerator operation amount sensor 76. The HV ECU 60 is also supplied with a signal indicating the shift position of the shift lever 30, from a shift position sensor 80. Furthermore, the HV ECU 60 is supplied with signals indicating an engine rotation speed (number of revolutions) Ne, a motor rotation speed (number of rotations) Nm, an input shaft rotation speed (rotation speed of the input shaft 22) Nin, an output shaft rotation speed (rotation speed of the output shaft 44) Nout, and a requested braking torque TB from an engine rotation speed sensor 82, a motor rotation speed sensor 84, an input shaft rotation speed sensor 86, and an output shaft rotation speed sensor 88, and a brake control device 90 such as an ABS or the like. The output shaft rotation speed Nout corresponds to the vehicle speed V. Various other signals indicating states of operation, such as the quantity of charge SOC of the battery 42 and the like, are also supplied to the HV ECU 60. The quantity of charge SOC may merely be the battery voltage, and may also be determined by serially accumulating the amounts of charge and discharge. The amount of accelerator operation θac corresponds to the amount of output requested by a driving person of the vehicle.

Figure 6:
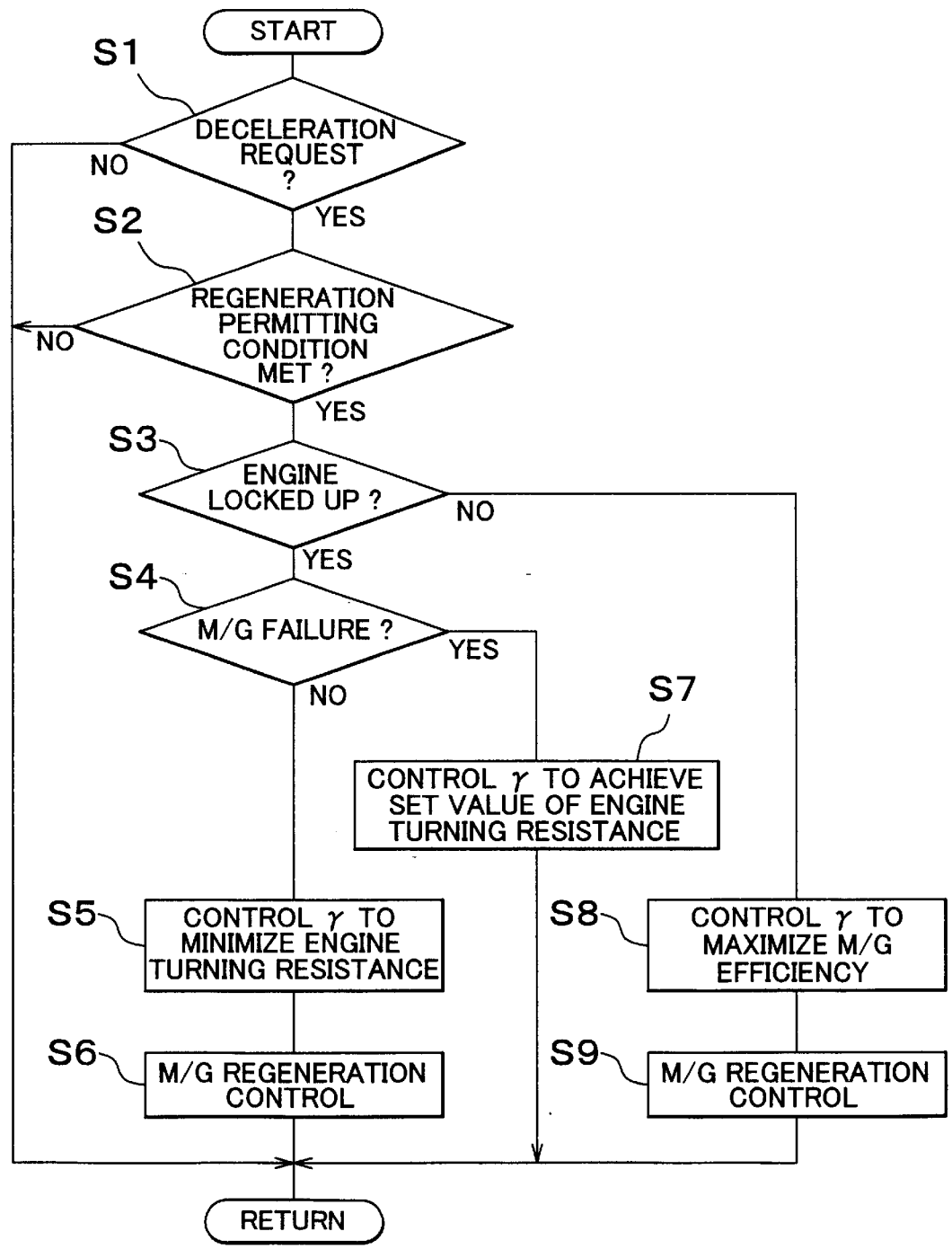
FIG. 6 is a flowchart of a regeneration control in accordance with the embodiment, illustrating an operation performed at the time of regeneration control of the motor-generator during a forward vehicle run.

FIG. 6 is a flowchart illustrating a regeneration control process of, during a forward run of the vehicle, generating electricity through regeneration control of the motor-generator 16 and applying a predetermined braking force to the vehicle. This regeneration control process is repeatedly executed at predetermined cycle time through the signal processing performed by the HV ECU 60, the M/G ECU 66 and the T/M ECU 68. Steps S6 and S9 in FIG. 6 are executed by the M/G ECU 66. Steps S5, S7 and S8 are executed by the T/M ECU 68.

In step S1 in FIG. 6, it is determined whether there is a deceleration request from the brake control device 90, that is, whether a signal indicating the requested braking torque TB has been supplied. If the signal indicating the requested braking torque TB has been supplied, the process proceeds to step S2. The requested braking torque TB is determined in accordance with the depressing force on the foot brake (the brake amount requested by a driver) and the like so as to achieve a desired braking force in coordination with the braking devices provided for the wheels, for example, if the foot brake is depressed during a forward run of the vehicle while the shift lever 30 is at the "B" or "D" position.

In step S2, it is determined whether a predetermined condition for permitting regeneration is met. If the condition is met, the process proceeds to step S3. The regeneration permitting condition is, for example, a condition that the quantity of charge SOC of the battery 42 is less than or equal to a predetermined value so that the charging of the battery 42 is allowed, a condition that the temperature of the motor-generator 16 or the temperature of the inverter 74 is less than or equal to a predetermined value so that the regeneration control is possible, a condition that the vehicle speed V is greater than or equal to a predetermined value (e.g., 10 km/h) so that there is no danger of the regeneration control degrading the driving feeling and there is no need for a complicated control such as a creep control or the like, etc.

In step S3, it is determined whether the engine 14 is connected in a locked-up fashion, that is, whether the "locked-up mode" in which the first clutch C1 and the second clutch C2 are both engaged has been entered. If the present mode is the "locked-up mode", the process proceeds to step S4. If the present mode is not the "locked-up mode", that is, if the present mode is the "motor run mode (forward)" in which the second clutch C2 is released, the process proceeds to step S8. During the regeneration control, it is desirable that the second clutch C2 be released to disconnect the engine 14 in order to efficiently convert kinetic energy of the vehicle into electric energy. However, if there is a need to use the engine 14 as a vehicle-driving power source for a re-acceleration, for example, if the vehicle is running at a high vehicle speed V that is greater than or equal to a predetermined value (e.g., 55 km/h), or if the quantity of charge SOC of the battery 42 is less than or equal to a predetermined value, it is desirable to quickly obtain a drive power from the engine 14. Therefore, under such a condition, the second clutch C2 is engaged so that the engine 14 is passively turned. It should be noted herein that during the regeneration control, that is, while the foot brake is on, the fuel supply to the engine 14 is cut. If the engine 14 is disconnected, the engine 14 stops turning.

In step S4, it is determined whether the regeneration control is impossible due to a failure in the motor-generator 16, the inverter 74 or an electric system thereof, based on, for example, a relationship between the motor rotation speed Nm and the control command for the motor-generator 16, a diagnosis, etc. If there is no such failure, the speed ratio γ of the transmission 12 is controlled in step S5 so as to minimize the turning resistance of the engine 14 due to the friction loss or the pump effect. The turning resistance of the engine 14 decreases with decreases in the engine rotation speed Ne. Therefore, it is appropriate to minimize the speed ratio γ so that the turning resistance is minimized within a range of the rotation speed Ne (equal to the input shaft rotation speed Nin) that can be achieved by the shift control of the transmission 12. However, if the rotation speed Ne becomes excessively low, quick restart of the engine becomes impossible. In this embodiment, therefore, a predetermined lower limit value $Ne_{min}$ (e.g., 1200 rpm or the like) that allows the engine 14 to be quickly started by fuel injection or ignition is provided. Hence, the shift control is performed so as to achieve a minimum engine rotation speed that is greater than or equal to the lower limit value $Ne_{min}$ and that is achievable by the shift control of the transmission 12.

Figure 7A:
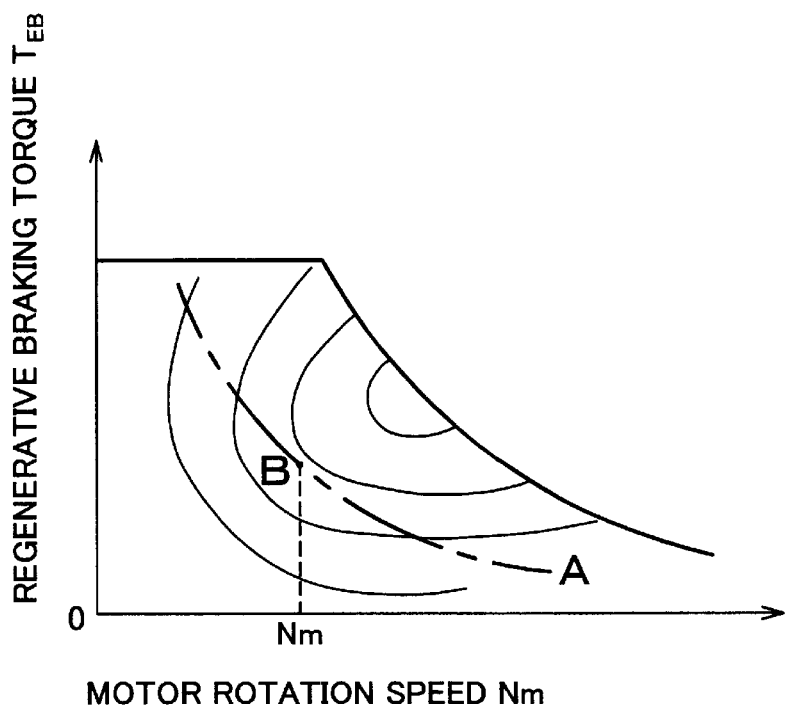
FIG. 7a is a diagram illustrating a shift control and a regeneration control executed in accordance with the flowchart of FIG. 6 during a disconnected state in which the engine is disconnected, wherein the horizontal axis indicates the motor rotation speed, and the vertical axis indicates the regenerative braking torque.
Figure 7B:
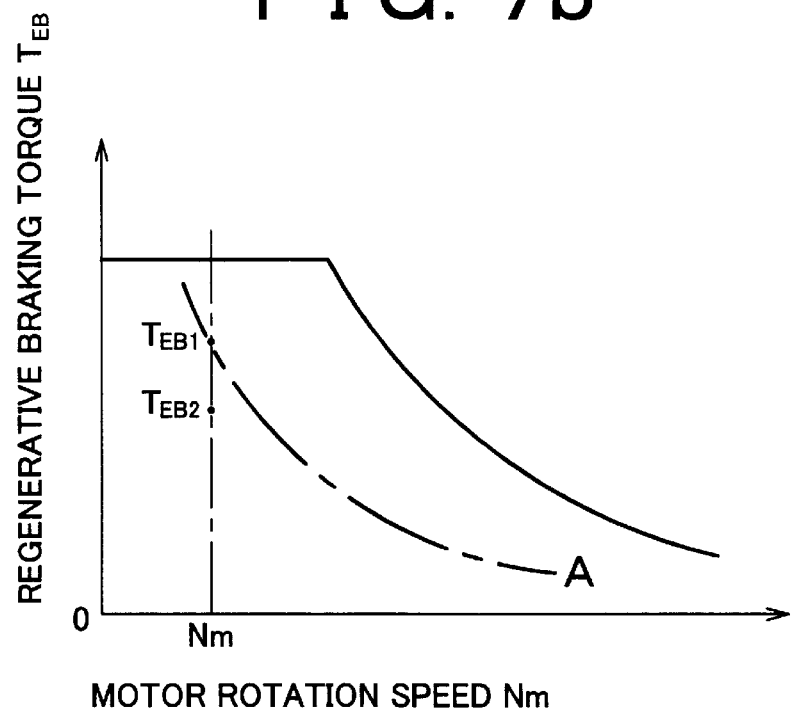
FIG. 7b is a diagram illustrating a shift control and a regeneration control executed in accordance with the flowchart of FIG. 6 during a connected state in which the engine is connected, wherein the horizontal axis indicates the motor rotation speed, and the vertical axis indicates the regenerative braking torque

Subsequently in step S6, the regenerative braking torque $T_{EB}$ of the motor-generator 16 is controlled so as to achieve a braking work per unit time (braking power) $P_B$ obtained by subtracting an amount corresponding to the turning resistance of the engine 14 from a requested braking power that is determined in accordance with the requested braking torque TB and the vehicle speed V. FIG. 7*b* is a diagram indicating a case where the input shaft rotation speed Nin (=Ne=Nm) is set to the lower limit value $Ne_{min}$ by the shift control in step S5. In this diagram, for example, a regenerative braking torque $T_{EB1}$ is determined which is indicated by a point of intersection between a motor-generator rotation speed Nm-braking torque $T_{EB}$ line A that provides the requested braking power $P_B$ and the line of the then-occurring motor rotation speed Nm (=$Ne_{min}$). By subtracting the turning resistance torque of the engine 14 from the regenerative braking torque $T_{EB1}$, the regenerative braking torque $T_{EB2}$ of the motor-generator 16 can be determined. The requested braking power $P_B$ may be determined by multiplying the requested braking torque $T_B$ by the vehicle speed V. The regenerative braking torque $T_{EB1}$ indicated by the point of intersection may be determined by dividing the requested braking power $P_B$ by the then-occurring motor rotation speed Nm (=$Ne_{min}$). The turning resistance torque of the engine 14 can be determined from a predetermined map or arithmetic expression using the rotation speed Ne as a parameter. Therefore, the vehicle is provided with the requested braking torque $T_B$ based on the regeneration control of the motor-generator 16 and the turning resistance of the engine 14, so that a desired braking force can be produced in coordination with the wheel braking device.

If the regeneration control is impossible due to a failure in the motor-generator 16 or the like, step S4 is followed by step S7, in which the turning resistance of the engine due to the friction loss and the pump effect is increased and, on the basis of the increased turning resistance, the speed ratio γ of the transmission 12 is controlled so as to achieve the requested braking torque $T_B$. In a specific example, an engine rotation speed Ne that provides a requested braking power $P_B$ determined in accordance with the requested braking torque $T_B$ and the vehicle speed V is determined through the use of a predetermined map or arithmetic expression or the like, and the speed ratio γ is controlled so as to achieve the determined engine rotation speed Ne. Therefore, the vehicle is provided with a requested braking torque $T_B$ based on the turning resistance of the engine 14, so that a desired braking force can be achieved in coordination with the wheel braking device. A guard of an upper limit value $Ne_{max}$ may be set in order to prevent overspeed of the engine 14. If in such a case, the targeted rotation speed Ne cannot be achieved despite the speed ratio γ being set to a maximum value $γ_{max}$, the speed ratio γ is set to the maximum value $γ_{max}$.

If the second clutch C2 is released and the engine 14 is disconnected, step S8 is executed as mentioned above. In step S8, the speed ratio γ of the transmission 12 is controlled so as to maximize the electric power generation efficiency of the motor-generator 16. That is, as indicated in FIG. 7*a*, on a motor-generator rotation speed Nm-braking torque $T_{EB}$ line A that provides a requested braking power $P_B$ determined in accordance with the requested braking torque $T_B$ and the vehicle speed V, and within the range of rotation speed achievable by the shift control of the transmission 12, an operation point B at which the electric power generation efficiency becomes maximized is determined from a predetermined efficiency map (the slender lines in FIG. 7*a*). The rotation speed Nm at the operation point B is set as a target rotation speed Nm*. The speed ratio γ of the transmission 12 is controlled so that the input shaft rotation speed Nin (=Nm) reaches the target rotation speed Nm*.

Subsequently in step S9, the regeneration control of the motor-generator 16 is performed at the regenerative braking torque $T_{EB}$ at the operation point B. Therefore, electricity can be generated at the maximum energy efficiency and can be stored into the battery 42. Furthermore, the vehicle is provided with the requested braking torque $T_B$ based on the regeneration control of the motor-generator 16, so that a desired braking force can be achieved in coordination with the wheel braking device.

Thus, according to the hybrid drive control apparatus 10 of this embodiment, when the regeneration control of the motor-generator 16 is performed to charge the battery 42 and apply a predetermined braking force to the vehicle, the shift control of the transmission 12 is performed on different bases in step S5 and step S8, that is, during a connected state (locked-up mode) in which the engine 14 is passively turned and during a disconnected state (motor run mode) in which the engine 14 is disconnected. Therefore, during each of the states, the regeneration control of the motor-generator 16 can be performed at excellent energy efficiency.

That is, according to this embodiment, during the disconnected state where the engine 14 is disconnected, the shift control is performed in step S8 so that the electric power generation efficiency of the motor-generator 16 reaches a maximum under a predetermined condition. Therefore, electricity can be generated at such a high energy efficiency as in the conventional technology, and can be stored into the battery 42. During the connected state where the engine 14 is passively turned, the shift control is performed in step S5 so that the turning resistance becomes minimized under a predetermined condition. Therefore, the energy loss due to the turning resistance of the engine 14 is minimized, and the electric energy that can be recovered by the regeneration control of the motor-generator 16 correspondingly increases.

The shift control based on the turning resistance of the engine 14 reduces the electric power generation efficiency of the motor-generator 16. However, the fluctuation in the electric power generation efficiency of the motor-generator 16 is small compared with the fluctuation in the turning resistance of the engine 14. Therefore, by performing the shift control so that the turning resistance of the engine 14 decreases, it is possible to increase the amount of electricity generated by the motor-generator 16 in total. That is, if during the connected state of the engine 14, that is, the locked-up state thereof, the shift control is performed so that the engine rotation speed reaches the target rotation speed Nm*, the regenerative braking torque $T_{EB}$ borne by the motor-generator 16 decreases due to the great turning resistance of the engine 14. The amount of electricity generated by the motor-generator 16 correspondingly decreases. It is also possible to perform the shift control so as to allow electric power generation at higher energy efficiency in total, by reducing the turning resistance of the engine 14 as a basic operation while introducing the fluctuation in the electric power generation efficiency of the motor-generator 16 as a factor. Besides the power generation efficiency of the motor-generator 16, the charging efficiency of the battery 42 and the like may also be factored into the shift control, that is, the rotation speed control of the motor-generator 16.

According to the embodiment, if the regeneration control is made impossible by a failure in the motor-generator 16 or the like during the connected state (locked-up mode) where the engine 14 is passively turned, the speed ratio γ of the transmission 12 is controlled based on the turning resistance of the engine 14, basically in such a manner that the requested braking torque $T_B$ can be achieved. Therefore, even when the regenerative braking torque cannot be provided by the motor-generator 16, a predetermined braking force is produced based on the turning resistance of the engine 14. Hence, uncomfortable feeling caused by the presence and absence of the regenerative braking torque provided by the motor-generator 16 is reduced or eliminated.

Furthermore, since the transmission 12 in this embodiment is a belt-type continuously variable transmission, the regeneration control of the motor-generator 16 can be performed constantly at high energy efficiency by continuously shifting the speed ratio γ in accordance with changes in the vehicle speed V.

The controller (for example, the various ECUs) of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A regeneration control apparatus for a vehicle, comprising:
   an internal combustion engine connected to a drive wheel of the vehicle via a transmission capable of shifting a speed ratio;
   a connection-disconnection device that is selectively engaged to allow and disengaged to prohibit a power transfer between the internal combustion engine and the transmission;
   a rotation device that is connected to the drive wheel via the transmission and that functions at least as an electric power generator; and
   a controller that performs a regeneration control of the rotation device so that the rotation device generates electricity and applies a braking force to the vehicle during running of the vehicle, and that, during the regeneration control, selectively controls the speed ratio of the transmission on different bases depending on whether the connection-disconnection device is in an engaged state or a disengaged state,
   wherein the controller controls the speed ratio so that a turning resistance of the internal combustion engine decreases, if the connection-disconnection device is in the engaged state.

2. The regeneration control apparatus according to claim 1, wherein the controller controls the speed ratio so that an electric power generation efficiency of the rotation device increases, if the connection-disconnection device is in the disengaged state.

3. The regeneration control apparatus according to claim 2, wherein the transmission is a continuously variable transmission.

4. The regeneration control apparatus according to claim 1, wherein the controller controls the speed ratio so that the turning resistance of the internal combustion engine increases, if the rotation device has a failure when the connection-disconnection device is in the engaged state.

5. The regeneration control apparatus according to claim 4, wherein the transmission is a continuously variable transmission.

6. The regeneration control apparatus according to claim 1, wherein the controller controls the speed ratio so that a turning resistance of the internal combustion engine decreases, if the connection-disconnection device is in the engaged state.

7. The regeneration control apparatus according to claim 6, wherein the controller controls the speed ratio so that the turning resistance of the internal combustion engine increases, if the rotation device has a failure when the connection-disconnection device is in the engaged state.

8. The regeneration control apparatus according to claim 7, wherein the transmission is a continuously variable transmission.

9. The regeneration control apparatus according to claim 1, wherein the transmission is a continuously variable transmission.

10. A regeneration control apparatus for a vehicle, comprising:
    an internal combustion engine connected to a drive wheel of the vehicle via a transmission capable of shifting a speed ratio;
    a connection-disconnection device that is selectively engaged to allow and disengaged to prohibit a power transfer between the internal combustion engine and the transmission;
    a rotation device that is connected to the drive wheel via the transmission and that functions at least as an electric power generator;
    a regeneration controller that performs a regeneration control of the rotation device so that the rotation device generates electricity and applies a braking force to the vehicle during running of the vehicle; and
    a during-regeneration shift controller that selectively controls the speed ratio of the transmission on different bases depending on whether the connection-disconnection device is in an engaged state or a disengaged state during the regeneration control by the regeneration controller,
    wherein the during-regeneration shift controller controls the speed ratio so that a turning resistance of the internal combustion engine decreases, if the connection-disconnection device is in the engaged state.

11. The regeneration control apparatus according to claim 10, wherein the during-regeneration shift controller controls the speed ratio so that an electric power generation efficiency of the rotation device increases, if the connection-disconnection device is in the disengaged state.

12. The regeneration control apparatus according to claim 10, wherein the during-regeneration shift controller controls the speed ratio so that the turning resistance of the internal combustion engine increases, if the rotation device has a failure when the connection-disconnection device is in the engaged state.

13. The regeneration control apparatus according to claim 12, wherein the transmission is a continuously variable transmission.

14. The regeneration control apparatus according to claim 10, wherein the during-regeneration shift controller controls the speed ratio so that a turning resistance of the internal combustion engine decreases, if the connection-disconnection device is in the engaged state.

15. The regeneration control apparatus according to claim 14, wherein the during-regeneration shift controller controls the speed ratio so that the turning resistance of the internal combustion engine increases, if the rotation device has a failure when the connection-disconnection device is in the engaged state.

16. The regeneration control apparatus according to claim 10, wherein the transmission is a continuously variable transmission.

17. A method of controlling regeneration of electric power in a vehicle that includes an internal combustion engine connected to a drive wheel of the vehicle via a transmission capable of shifting a speed ratio, a connection-disconnection device that is selectively engaged to allow and disengaged to prohibit a power transfer between the internal combustion engine and the transmission, and a rotation device that is connected to the drive wheel via the transmission and that functions at least as an electric power generator, the control method comprising:

determining whether the vehicle has a deceleration request;

determining whether the connection-disconnection device is in an engaged state or a disengaged state, if the deceleration request is present;

selectively controlling the speed ratio of the transmission on different bases depending on whether the connection-disconnection device is determined to be in the engaged state or the disengaged state; and performing a regeneration control of the rotation device so that the rotation device generates electricity and applies a braking force to the vehicle, wherein the speed ratio is controlled so that a turning resistance of the internal combustion engine decreases, if the connection-disconnection device is determined to be in the engaged state.

18. The method according to claim 17, wherein the speed ratio is controlled so that an electric power generation efficiency of the rotation device increases, if the connection-disconnection device is determined to be in the disengaged state.

19. The method according to claim 17, wherein the speed ratio is controlled so that a turning resistance of the internal combustion engine increases, if the rotation device has a failure when the connection-disconnection device is determined to be in the engaged state.

* * * * *